US009112938B2

(12) United States Patent
Tippin et al.

(10) Patent No.: US 9,112,938 B2
(45) Date of Patent: Aug. 18, 2015

(54) ADAPTIVE PLAYBACK WITH LOOK-AHEAD

(71) Applicant: Google Inc., Mountain View, CA (US)

(72) Inventors: Chad A. Tippin, Dunedin, FL (US); Nicholas A. Wormley, St. Paul, MN (US)

(73) Assignee: Google Inc., Mountain View, CA (US)

( * ) Notice: Subject to any disclaimer, the term of this patent is extended or adjusted under 35 U.S.C. 154(b) by 365 days.

(21) Appl. No.: 13/741,202

(22) Filed: Jan. 14, 2013

(65) Prior Publication Data

US 2013/0132525 A1    May 23, 2013

Related U.S. Application Data

(63) Continuation of application No. 12/630,582, filed on Dec. 3, 2009, now Pat. No. 8,375,140.

(60) Provisional application No. 61/119,854, filed on Dec. 4, 2008.

(51) Int. Cl.
*H04L 29/06* (2006.01)
*H04N 21/2343* (2011.01)
(Continued)

(52) U.S. Cl.
CPC .......... *H04L 65/60* (2013.01); *H04N 21/23424* (2013.01); *H04N 21/23439* (2013.01); *H04N 21/4307* (2013.01); *H04N 21/44004* (2013.01); *H04N 21/44016* (2013.01); *H04N 21/44209* (2013.01); *H04N 21/4621* (2013.01); *H04N 21/6125* (2013.01); *H04N 21/6373* (2013.01);
(Continued)

(58) Field of Classification Search
None
See application file for complete search history.

(56) References Cited

U.S. PATENT DOCUMENTS 4,881,264 A    11/1989  Merkle
6,141,659 A    10/2000  Barker et al.
(Continued)

FOREIGN PATENT DOCUMENTS

EP    1298931    4/2003
EP    1638333    3/2006
(Continued)

OTHER PUBLICATIONS

"Video Compression Picture Types," from Wikipedia, the free encyclopedia, http://en.wikipedia.org/w/index.php?title=Video_compression_picture_types&oldid=252563025, XP-002571418, printed Mar. 4, 2010, 5 pages.
(Continued)

*Primary Examiner* — Hamza Algibhah
*Assistant Examiner* — James Edwards
(74) *Attorney, Agent, or Firm* — Amin, Turocy & Watson, LLP

(57) ABSTRACT

The disclosure provides for a download agent executing on a computing device to dynamically select between media files when a portion of the media file that is currently being downloaded has a portion average playback rate that is greater than a throughput rate at which the computing device is receiving media files. During the portion where the portion average playback rate is greater than the throughput rate, the download agent may dynamically transition to a different media file where the portion average playback rate for the portion is less than or equal to the throughput rate. The download agent may then transition back to the original media file after downloading the portion form the different media file.

20 Claims, 7 Drawing Sheets

(51) Int. Cl.
*H04N 21/43* (2011.01)
*H04N 21/44* (2011.01)
*H04N 21/442* (2011.01)
*H04N 21/462* (2011.01)
*H04N 21/61* (2011.01)
*H04N 21/6373* (2011.01)
*H04N 21/845* (2011.01)
*H04N 21/234* (2011.01)
*H04N 7/173* (2011.01)

(52) U.S. Cl.
CPC ........ *H04N 21/8456* (2013.01); *H04N 7/17336* (2013.01); *H04N 21/23406* (2013.01)

(56) References Cited

U.S. PATENT DOCUMENTS

| | | | |
|---|---|---|---|
| 6,166,314 A * | 12/2000 | Weinstock et al. | 84/483.1 |
| 6,169,747 B1 * | 1/2001 | Sartain et al. | 370/468 |
| 6,195,680 B1 | 2/2001 | Goldszmidt et al. | |
| 6,292,490 B1 * | 9/2001 | Gratacap et al. | 370/412 |
| 6,339,785 B1 | 1/2002 | Feigenbaum | |
| 6,477,522 B1 | 11/2002 | Young | |
| 6,477,580 B1 * | 11/2002 | Bowman-Amuah | 709/231 |
| 6,601,136 B2 | 7/2003 | Gunaseelan et al. | |
| 6,697,356 B1 * | 2/2004 | Kretschmer et al. | 370/352 |
| 6,742,023 B1 | 5/2004 | Fanning et al. | |
| 6,771,674 B1 | 8/2004 | Schuster et al. | |
| 6,772,337 B1 | 8/2004 | Yener | |
| 7,047,309 B2 | 5/2006 | Baumann et al. | |
| 7,058,721 B1 | 6/2006 | Ellison et al. | |
| 7,133,368 B2 | 11/2006 | Zhang et al. | |
| 7,251,691 B2 | 7/2007 | Boyd et al. | |
| 7,277,950 B1 | 10/2007 | Chapweske | |
| 7,555,559 B2 | 6/2009 | Chapweske | |
| 2001/0008531 A1 * | 7/2001 | Lanigan et al. | 370/432 |
| 2001/0051996 A1 | 12/2001 | Cooper et al. | |
| 2002/0002708 A1 | 1/2002 | Arye | |
| 2002/0003541 A1 | 1/2002 | Boyd et al. | |
| 2002/0042924 A1 | 4/2002 | Adams | |
| 2002/0049760 A1 | 4/2002 | Scott et al. | |
| 2002/0049846 A1 | 4/2002 | Horen et al. | |
| 2002/0065922 A1 | 5/2002 | Shastri | |
| 2002/0108112 A1 | 8/2002 | Wallace et al. | |
| 2002/0133247 A1 | 9/2002 | Smith et al. | |
| 2002/0138443 A1 | 9/2002 | Schran et al. | |
| 2003/0184598 A1 * | 10/2003 | Graham | 345/838 |
| 2004/0064573 A1 | 4/2004 | Leaning et al. | |
| 2004/0078470 A1 | 4/2004 | Baumeister et al. | |
| 2004/0103372 A1 * | 5/2004 | Graham | 715/513 |
| 2004/0111526 A1 | 6/2004 | Baldwin et al. | |
| 2004/0193900 A1 | 9/2004 | Nair | |
| 2004/0205093 A1 | 10/2004 | Li et al. | |
| 2005/0010792 A1 | 1/2005 | Carpentier et al. | |
| 2005/0021575 A1 | 1/2005 | Boyd et al. | |
| 2005/0102371 A1 | 5/2005 | Aksu | |
| 2005/0183120 A1 | 8/2005 | Jain et al. | |
| 2005/0207733 A1 * | 9/2005 | Gargi | 386/68 |
| 2006/0026161 A1 | 2/2006 | Henseler | |
| 2006/0233237 A1 * | 10/2006 | Lu et al. | 375/240.03 |
| 2006/0235883 A1 | 10/2006 | Krebs | |
| 2007/0078876 A1 | 4/2007 | Hayashi et al. | |
| 2007/0088844 A1 | 4/2007 | Seims | |
| 2007/0157267 A1 | 7/2007 | Lopez-Estrada | |
| 2007/0261072 A1 | 11/2007 | Boulet et al. | |
| 2008/0040497 A1 | 2/2008 | Venkatramani et al. | |
| 2008/0046917 A1 | 2/2008 | de Heer | |
| 2008/0050096 A1 | 2/2008 | Ryu | |
| 2008/0104121 A1 | 5/2008 | Gottlieb et al. | |
| 2008/0141317 A1 | 6/2008 | Radloff et al. | |
| 2008/0201416 A1 | 8/2008 | Lipton | |
| 2009/0106356 A1 | 4/2009 | Brase et al. | |
| 2009/0150557 A1 | 6/2009 | Wormley et al. | |
| 2009/0185619 A1 | 7/2009 | Taleb et al. | |
| 2009/0287841 A1 | 11/2009 | Chapweske et al. | |
| 2009/0327512 A1 | 12/2009 | Chapweske et al. | |
| 2009/0328124 A1 * | 12/2009 | Khouzam et al. | 725/116 |
| 2010/0023579 A1 | 1/2010 | Chapweske et al. | |
| 2010/0057928 A1 * | 3/2010 | Kapoor et al. | 709/231 |
| 2010/0191656 A1 | 7/2010 | Martin et al. | |
| 2011/0161493 A1 * | 6/2011 | Hamel et al. | 709/224 |

FOREIGN PATENT DOCUMENTS

| | | |
|---|---|---|
| GB | 2395387 | 5/2004 |
| WO | 0139002 | 5/2001 |
| WO | 0191417 | 11/2001 |
| WO | 2007063430 | 6/2007 |
| WO | 2009075766 | 6/2009 |

OTHER PUBLICATIONS

Kaminsky, "Vectorcast: A Proposal Regarding the efficient Distribution of Data on High Bandwidth Networks," Jan. 12, 1998, 4 pp.
Francis, "Yallcast: Extending the Internet Multicast Architecture," Sep. 30, 1999, 37 pp.
Byers et al., "Accessing Multiple Mirror Sites in Parallel: Using Tornado Codes to Speed Up Downloads," Apr. 1999, pp. 275-283.
Dessent, "Brian's BitTorrent FAQ and Guide," May 10, 2003, accessed from http://www.dessent.net/btfaq, 40 pp.
Koman, "The Swarmcast Solution," May 24, 2001, accessed from http://openp2p.com/lpt/a/883, 4 pp.
Padmanabhan et al., "Distributing Streaming Media Content Using Cooperative Networking," Proceedings of the 12th International Workshop on Network and Operating Systems Support for Digital Audio: NOSSDAV, May 12-14, 2002, pp. 177-186.
Byers et al., "A Digital Fountain Approach to Reliable Distribution of Bulk Data," Proc. ACM SIGCOMM, ACM Press, New York, 1998, pp. 56-67.
Goyal, "Multiple Description Coding; Compression Meets the Network," IEEE Signal Processing Magazine, vol. 18, 2001, pp. 74-93.
Office Action from U.S. Appl. No. 12/630,582, dated Oct. 31, 2011, 24 pages.
Office Action from U.S. Appl. No. 12/630,582, dated Mar. 14, 2012, 27 pages.
Notice of Allowance from U.S. Appl. No. 12/630,582, dated Oct. 9, 2012, 9 pages.
Chu et al., "A Case for End System Multicast" Proceedings ACM SIGMETRICS 2000: International Conference on Measurement and Modeling of Computer Systems, Jun. 17-21, 2001, pp. 1-12.
Rejaie et al., "Architectural Considerations for Playback of Quality Adaptive Video Over the Internet," Proceedings IEEE International Conference on Networks, Sep. 2000, pp. 204-209.
Wang, "Traffic Regulation under the Percentile-Based Pricing Policy," Proceedings of the First International Conference on Scalable Information Systems, Jun. 2006, 8 pp.
Duffield et al., "Issues of Quality and Multiplexing When Smoothing Rate Adaptive Video," IEEE Transactions on Multimedia, vol. I, No. 4, Dec. 1999, 13 pp.
Gurses et al., "A Simple and Effective Mechanism for Stored Video Streaming with TCP Transport and Server-Side Adaptive Frame Discard," Computer Networks, 48, Dec. 30, 2004, pp. 489-501.
Birney, "Intelligent Streaming," Inside Windows Media, Nov. 19, 1999, XP-002177089, 9 pp.
Notification of Transmittal of the International Search Report and the Written Opinion of the International Searching Authority, or the Declaration for corresponding patent application No. PCT/US2009/066613, mailed Mar. 19, 2010, 19 pages.
Carter et al., "Dynamic Server Selection using Bandwidth Probing in Wide-Area Networks," Computer Science Department, Boston University, Mar. 18, 1996, 20 pp.
Suh et al., "Push-to-Peer Video-on-Demand system: design and evaluation," Thomson Technical Report, Nov. 29, 2006, 15 pp.
Rodriguez et al., "Parallel-Access for Mirror Sites in the Internet," Institut EURECOM, Mar. 26, 2000, 864-873 pp.
Office Action from U.S. Appl. No. 12/328,139, dated Feb. 9, 2011, 14 pp.
Response to Office Action dated Feb. 9, 2011, from U.S. Appl. No. 12/328,139, dated Apr. 11, 2011, 10 pp.

(56) References Cited

OTHER PUBLICATIONS

Advisory Action from U.S. Appl. No. 12/328,139, dated May 5, 2011, 3 pp.
Responsive Amendment after Final Office Action dated Feb. 9, 2011, and Advisory Action dated May 5, 2011, for U.S. Appl. No. 12/328,139, filed May 9, 2011, 20 pp.
Office Action from U.S. Appl. No. 12/252,782, dated May 16, 2011, 13 pp.
Response to Office Action dated May 16, 2011, from U.S. Appl. No. 12/252,782, filed Aug. 16, 2011, 20 pp.
Office Action from U.S. Appl. No. 12/486,589, dated May 31, 2011, 12 pp.
Response to Office Action dated May 31, 2011, from U.S. Appl. No. 12/486,589, filed Aug. 31, 2011, 19 pp.
Notification Concerning Transmittal of the International Preliminary Report on Patentability (Chapter I of the Patent Cooperation Treaty), (PCT Rule 44bis. 1(c)) for corresponding international application No. PCT/US2009/066613, dated Jun. 16, 2011, 11 pp.
Office Action from U.S. Appl. No. 12/630,582, dated Oct. 31, 2011, 24 pp.
Notice of Allowance from U.S. Appl. No. 12/486,589, mailed Nov. 29, 2011, 16 pp.
Office Action from U.S. Appl. No. 12/630,582, dated Mar. 14, 2012, 27 pp.

* cited by examiner

ADAPTIVE PLAYBACK WITH LOOK-AHEAD

CROSS REFERENCE TO RELATED APPLICATIONS

This application is a continuation of U.S. patent application Ser. No. 12/630,582 filed Dec. 3, 2009 entitled "ADAPTIVE PLAYBACK RATE WITH LOOK AHEAD" which claims priority from U.S. Provisional Application Ser. No. 61/119,854 filed Dec. 4, 2008, entitled "ADAPTIVE PLAYBACK RATE WITH LOOK-AHEAD", the entire contents of each are incorporated herein by reference.

TECHNICAL FIELD

The invention relates to computer networks and particularly to downloading media data on computer networks.

BACKGROUND

Media content providers provide media content to users via one or more computer networks. Generally, individual users (e.g., subscribers) receive media content from media content providers through one or more point to point network links and display the media content via a media player. The displaying of media content is referred to as playback.

Point to point network links have an established maximum throughput as measured in bits per second; the established maximum throughput owing to either underlying technology of the link or contracted service levels for the users. Actual throughput is the throughput rate at which the network and its point to point links actually convey the data from the content provider to the individual user. The actual throughput to the user may only be a fraction of the maximum throughput based on environmental conditions and competing network traffic.

Since the actual throughput may vary based on environmental conditions and competing network traffic, the rate at which a subscriber's media player must consume (i.e., receive and play) media over a network connection (be it a constant rate or an average rate) to achieve uninterrupted playback may exceed the actual network throughput bit rate from the media content provider. In these situations, the media player must pause to wait for more data from the media content provider to arrive before it can continue to playback the media content. This pause, often referred to as buffering or re-buffering can greatly diminish the enjoyment of media viewing. In other situations, the client device (i.e., the device used to display the media content to the subscriber), may have insufficient computing resources to decode and present the media content in "real-time." In these situations, portions of the media content may be discarded, undecoded, or unplayed so that the media player may maintain proper playback of the received media content. The playback may also slow down to present all the data of the media content, but at a reduced rate. Either the dropping of data or the slowing of playback can reduce enjoyment, and if excessive, render the media content unwatchable.

To avoid buffering, dropping of data, or slowing of playback, media content providers may provide the user with either the option of selecting an alternate playback rate (e.g., high or low quality) based on their particular point-to-point network connection or selecting a default playback rate. However, during playback if the selected playback rate or default playback rate exceeds the network throughput or the computing resources of the client device displaying the media content, the user has to explicitly begin playback of the media content at a reduced playback rate which can cause startup delay associated with buffering and can require the user to start from the beginning of the media content. Needing to restart from the beginning every time the selected playback rate or default playback rate exceed the network throughput or the computing resources of the device can drastically reduce the enjoyment of the media content.

In another technique to avoid buffering, dropping of data, or slowing of playback, the media player transmits playback status to the media content provider. The playback status can be the buffering time, the number of frames dropped, or the rate of playback. The media content provider dynamically varies the bit rate of the media content to avoid buffering, dropping data, or slowing playback. However this technique has the negative consequence of requiring a separate content stream tailored for each recipient.

SUMMARY

In general, this disclosure describes a download agent executing on a computing device of a user (i.e., subscriber) to dynamically select between different playback rates for delivery of media content provided by a media content provider. As used herein the term "playback rate" refers to the rate at which the media content is consumed by for example a media content decoder of a client device. For example, the subscriber-side download agent is capable of dynamically interrupting download and playback of current media content and initiating download of the same media at a different playback rate representation. The subscriber-side switch of playback rate presentation is forecasted and executed such that a seamless transition occurs from the current playback rate representation of the media to the new playback rate representation.

In one aspect, the disclosure is directed to a method for a client device to dynamically transition between different representations of media from a media server while presenting the media to a user. The method comprises determining, with the client device, a portion within a first media file being played on the client device where a portion average playback rate of the first media file for the portion is greater than a throughput rate at which the client device is downloading from the media server. The method further comprises selecting, with the client device, a second media file where a portion average playback rate of the second media file for the portion is less than or equal to the throughput rate. The method further comprises identifying, with the client device, a key frame in the first media file that is correlated to the portion and identifying a key frame in the second media file having a timestamp that is the same as or temporally proximate to the key frame in the first media file with respect to real-time playback of the media. The method further comprises transitioning, with the client device, from the first media file to the second media file, generating a bit stream on the client device by splicing data from the first media file up to the key frame in the first media file with data in the second media file following the key frame in the second media file to form the bit stream, and transmitting, with the client device, the bit stream to the media player for presentment to the user.

In another aspect, the disclosure is directed to a client device to dynamically transition between different representations of media from a media server while presenting the media to a user. The client device comprises a processor, and a download agent executing on the processor. The download agent comprises a playback controller that determines a portion within a first media file being played on the client device where a portion average playback rate of the first media file for the portion is greater than a throughput rate at which the client device is downloading from the media server, and selects a second media file where a portion average playback rate of the second media file for the portion is less than or equal to the throughput rate. The client device further comprises a source manager that transitions from the first media file to the second media file. The client device further comprises a stream agent that identifies a key frame in the first media file that is subsequent to a current frame begin played by the media player, identifies a key frame in the second media file having a timestamp that is the same as or temporally proximate to the key frame in the first media file with respect to real-time playback of the media, generates a bit stream, and transmits the bit stream to the media player for presentment to the user. The stream agent generates the bit stream by splicing data from the first media file up to the key frame in the first media file with data in the second media file following the key frame in the second media file.

In another aspect, the disclosure is directed to a computer-readable storage medium comprising instructions that cause one or more processors to determine a portion within a first media file being played on a client device where a portion average playback rate of the first media file for the portion is greater than a throughput rate at which the client device is downloading from the media server. The instructions further cause the one or more processors to select a second media file where a portion average playback rate of the second media file for the portion is less than or equal to the throughput rate. The instructions further cause the one or more processors to identify a key frame in the first media file that is correlated to the portion and identify a key frame in the second media file having a timestamp that is the same as or temporally proximate to the key frame in the first media file with respect to real-time playback of the media. The instruction further cause the one or more processors to transition from the first media file to the second media file, generate a bit stream on the client device by splicing data from the first media file up to the key frame in the first media file with data in the second media file following the key frame in the second media file to form the bit stream, and transmit the bit stream to a media player for presentment to a user.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
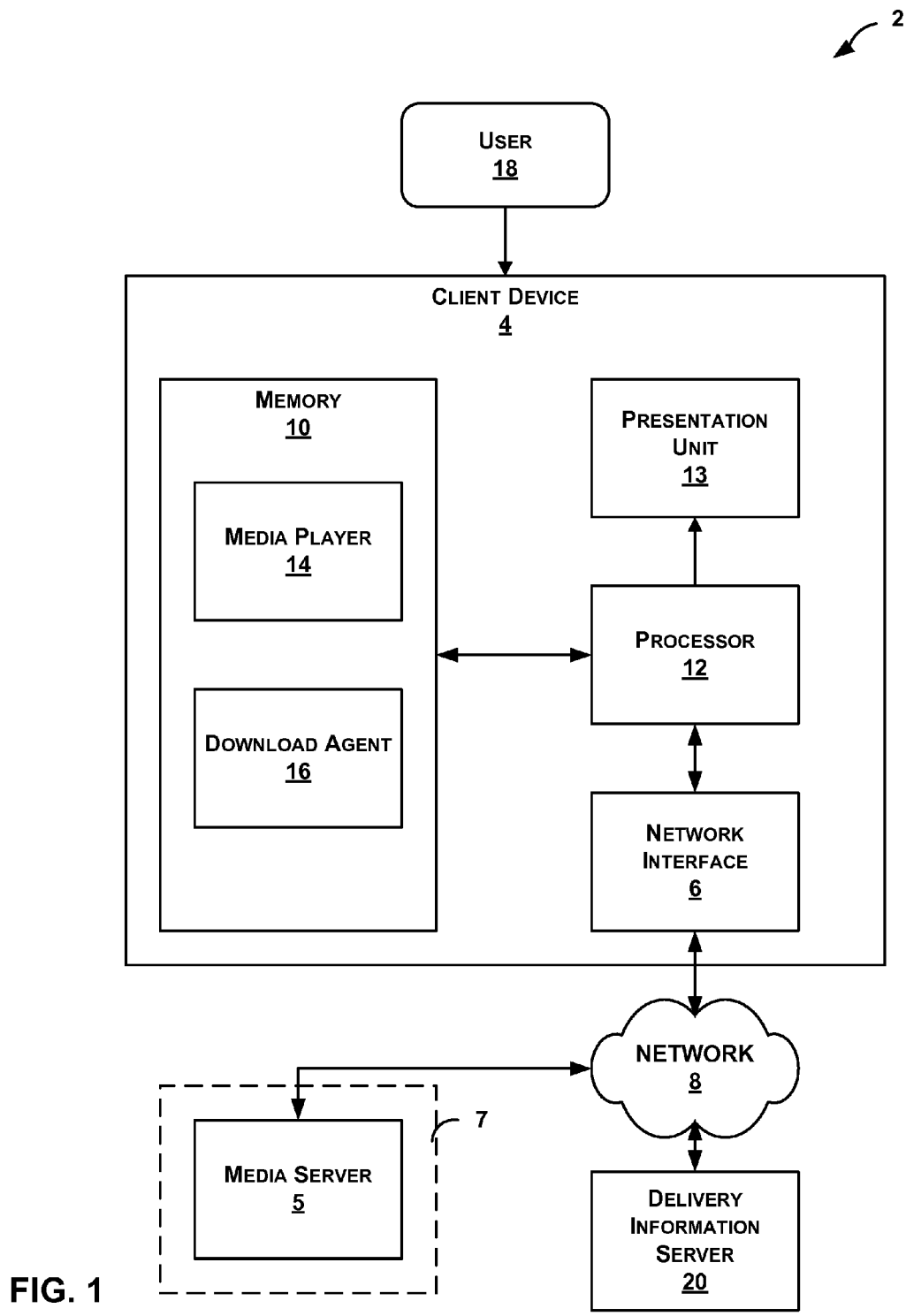
FIG. 1 is a block diagram illustrating an exemplary system in which a download agent dynamically selects media files from a media server.

In accordance with this disclosure, a server may store media content in a media asset (e.g. a media file). The server may be operated by a media content provider. The media asset may be encoded as variable bit rate (VBR) digital video or constant bit rate (CBR) digital video. A VBR video is encoded for a different playback rate at different portions within the VBR video. While a CBR video is encoded for the same playback rate throughout the CBR video. As used herein the term "playback rate" refers to the rate at which the media asset may be consumed by, for example, a media content decoder of a client device. For example, a VBR video may be encoded for a higher playback rate during dynamic video, e.g. rapid visual change, and encoded for a lower playback rate during less dynamic video, e.g. minimal visual change. In contrast, a CBR video may be encoded for the same playback rate regardless of whether there is dynamic video or less dynamic video. As one example, encoding the video may include compressing the video. For example, during minimal visual changes, the video may be compressed substantially as there is little change from one moment to another. However, during rapid visual changes, the video may not be compressed due to the rapid changes from one moment to another.

The playback rate of a VBR video may be represented in at least two ways. In a first way, the playback rate of the VBR video is represented as an overall average playback rate. The overall average playback rate is calculated by dividing the total number of bits in the VBR video by the total duration of the VBR video. However, the overall average playback rate fails to account for instances within the VBR video where the playback rate is higher or lower than the overall average playback rate. For example, the overall average playback rate fails to account for the playback rate for rapid visual changes and the playback rate for minimal visual changes.

In a second way, the playback rate of the VBR video is represented as a portion average playback rate. The portion average playback rate is the average playback rate over a portion of the media asset. The media asset may be divided down into portions. For example, a three hour VBR video may be divided down into three hundred and sixty thirty second portions. Thirty second portions is just one example. The VBR video may be divided down by more or less than thirty seconds. Furthermore, the portion need not be limited to temporal portions, e.g. thirty seconds. In some examples, the portion may be defined as a number of frames within the media asset.

For a CBR video the portion average playback rate may be the same as the overall average playback rate because the CBR video is encoded for the same playback rate throughout. Accordingly, as used herein, the term portion average playback rate and overall average playback rate may be interchangeable for CBR video.

In the context of video, each media asset of a VBR video contains a plurality of frames in accordance with a video compression scheme. One such frame is referred to as a key frame or intra picture that can be decoded without reference to other frames and may, for example, provide an entire encoded picture. The term "key frame" is used herein to generally refer to this type of frame within an encoded media stream. Other types frames that may be encoded within the stream include predicted pictures or bi-predicted pictures that generally contain image data and motion vector displacements that are relative to a previous key frame in the stream. A timestamp may be associated with each key frame. The timestamp indicates a temporal location of a key frame within the media asset.

The portion average playback rate may be calculated by dividing the number of bits in a portion of the VBR video by the duration of the VBR video during that portion. For example, assume the overall average playback rate for a VBR video is 1.2 megabits per second (Mbps). In the VBR video, rapid visual changes may start at ninety minutes and zero seconds into the VBR video and conclude at ninety minutes and thirty seconds into the VBR video. During the portion of rapid visual changes, i.e. ninety minutes zero seconds to ninety minutes thirty seconds, the portion average playback rate may be 3 Mbps. In this example, the portion may be defined as thirty seconds, i.e. ninety minutes and thirty seconds minus ninety minutes. A portion of thirty seconds is just one example. The portion may be greater or less than thirty seconds. Furthermore, the portion need not be uniform across the VBR video. The portion may vary over the VBR video. The portion average playback rate may also be different for each portion within the VBR video.

Accordingly, the overall average playback rate does not account for playback rate changes that may occur during the VBR video. The playback rate may be different at different portions of the VBR video, such as during rapid visual changes compared to minimal visual changes. The portion average playback rate may provide a better measure for the playback rate of the VBR video compared to the overall average playback rate.

As described above, a server may store a VBR video as a media asset. The media asset may be encoded for a certain playback rate, i.e. a certain overall average playback rate. A computing device, such as a client device, may download the media asset at a certain throughput rate, and display the media asset via a media player. Throughput rate is defined as the rate at which the client device receives the media asset. Throughput rate and playback rate should not be confused. To reiterate, the playback rate is the rate at which the media asset may be consumed by for example a media content decoder of the client device, and the throughput rate is the rate at which the client device receives the media asset. The client device receives the VBR encoded video as a media asset at the throughput rate of the client device. The client device may temporarily store the media asset within a buffer. In one example, a decoder within the client device receives the media asset from the buffer, decodes, e.g., decompresses, the media asset, and plays the video to the client. The rate at which the decoder retrieves the media asset from the buffer is the playback rate of the media asset. As described, the playback rate of the media asset may be different at various portions within the media asset. Accordingly, the decoder may retrieve the media asset at different rates at various portions within the media asset.

The decoder decodes the media content of the media asset to a form that is playable by the client device. The client device plays the decoded media content via a media player, as one example. In some examples, the rate at which the media player plays the decoded media content is constant.

Conventionally, it was considered that if the throughput rate of the client device is at least equal to the overall average playback rate of the media asset, the client device may be able to download the media asset without any viewing problems for a user of the client device. However, in accordance with this disclosure, this may not be an actual representation for possible viewing problems for the user. For example, if the portion average playback rate is greater than the throughput rate, then during that portion of the media asset, a client device may experience buffering or rebuffering which may cause the media player to pause displaying the media asset or drop portions of the media asset resulting in a less than desired viewing experience for the user of the client device.

In accordance with this disclosure, the server may store one or more media assets that each contain substantially similar media content, but are encoded for different playback rates.

For example, the server may store a first media asset encoded for an overall average playback rate of 1.2 Mbps. The server may also store a second media asset that contains substantially similar media content as the first media asset but is encoded for an overall average playback rate of 2 Mbps. The server may also store a third media asset that contains substantially similar media content as the first and second media files but is encoded for an overall average playback rate of 0.8 Mbps. The playback rates and the number of media assets are described merely as examples; there may be more or fewer media assets which may be encoded for different playback rates than those given in the examples.

Generally, media assets that are encoded for a higher playback rate compared to the other media assets contain higher visual quality data compared to the other media assets. This may be because higher visual quality media assets require more bits to be retrieved by the decoder in a same amount of time compared to lower visual quality media assets that require fewer bits to be retrieved by the decoder in the same amount of time.

In accordance with this disclosure, the server may also store the portion average playback rate value for each of the media assets. Keeping with the previous examples, the server may store the portion average playback rate value for each portion of the first, second, and third media assets. For example, if the portion is thirty seconds, the server may store the portion average playback rate for zero to twenty-nine seconds, thirty to fifty-nine seconds, and so on for each version of the media asset, i.e. first, second, and third media assets. As another example, if the portion is one key frame to another, the server may store the portion average playback rate for the first key frame to the second key frame, the second key frame to the third key frame and so on for each version of the media asset. The portions given are merely examples. The portions may be different in different examples. The server may store the portion average playback back value for each portion for each version of the media asset, e.g. first, second, and third media assets, separately, or may embed the portion average playback for each portion as metadata within each version of the media asset.

The client device may download a version of the media assets at a certain throughput rate. The version of the media asset may be the media asset that is encoded for a playback rate that is substantially close to the throughput rate. The client device may also download the portion average playback rate value for each portion within the media asset. Alternatively, the client device may receive the portion average playback rate value for each portion as embedded metadata within the media asset.

In accordance with this disclosure, a subscriber-side download agent within the media player of the client device may forecast when the portion average playback rate is greater than the throughput rate. The subscriber-side download agent is capable of dynamically interrupting download and playback of current media content and initiating download of the same media at a different playback rate representation. For example, the client device may be downloading a first media asset at a throughput rate of 2 Mbps. The first media asset may be encoded for an overall average playback rate of 1.2 Mbps. However, from ninety minutes to ninety minutes and thirty seconds the portion average playback rate is 3 Mbps. A second media asset may be encoded for an overall average playback rate of 0.8 Mbps, and the portion average playback rate from ninety minutes to ninety minutes and thirty seconds may be 1.8 Mbps. In accordance with this disclosure, the download agent may forecast that at ninety minutes, the download agent should dynamically transition from the first media asset to the second media asset so that the portion average playback rate does not exceed the throughput rate and the user can view the media asset with limited concern about the media player being paused to buffer or rebuffer data. After the media player downloads the portion of the media asset from the second media asset, the media player may dynamically transition back to the first media asset and continue downloading the first media asset.

In some examples, the download agent may dynamically transition from the first media asset to the second media asset at a time substantially close to ninety minutes. Alternatively, in some examples, the download agent may account for the amount of data that is already buffered by the media player before deciding whether to transition from the first media asset to the second media asset. The download agent may switch at a key frame that is substantially close to ninety minutes, and switch back at a key frame that is substantially close to ninety minutes and thirty seconds. As before, the throughput rate, overall average playback rate, and portion average playback rate are only examples shown for purposes of illustration and should be considered as limiting.

The subscriber-side switch of playback rate presentation is forecasted and executed such that a seamless transition occurs from the current playback rate representation of the media to the new playback rate representation at the same time-based playback point within both representations. As a result, the transition is seamless to the end-user without introducing delay or jitter and without requiring restart of the content delivery. Moreover, the subscriber-side initiation of the dynamic transition between playback rate representations may avoid any requirement that the client device report download and playback quality to the media content provider or other listening server.

To reiterate, the download agent may dynamically select between different media assets that contain substantially similar media content; however, the playback rate of the content may vary for the different media files. Generally, media assets with higher playback rates provide a higher visual quality experience compared to media files with lower playback rates. In accordance with this disclosure, the download agent is capable of downloading the highest visual quality media asset based on the throughput rate of the client device. The download agent may cause the client device to dynamically transition to a different media asset when the portion playback rate of the current media asset is greater than the throughput rate. The download agent may select the different media asset whose portion average playback rate is less than the throughput rate. After the download agent has downloaded the portion of the media asset from the different media asset, the download agent may transition back to the original media asset and continue downloading the media asset.

In one implementation, the download agent executing on the user's client device coordinates and initiates dynamic transition such that the cut-over between playback rates occurs at a video frame in both the original and new playback rate representations that is not dependent on other video frames within the stream. For example, the download agent may forecast and initiate the download of the media content at the new playback rate such that the switch over can occur at a subsequent (i.e, not yet played) frame within the media content; such frame being a "key frame" or "intra picture" or "intra frame" in the media for which the encoding is not based on a reference to any other picture or frame.

Dynamically selecting and splicing media from different media files with similar media content but varying playback rates may provide the advantage of avoiding buffering, dropping of data, or slowing of playback. Moreover, the techniques also avoid any requirement that the user restart the media asset from beginning when the actual throughput rate is not ideal. Furthermore, the techniques described herein allows the media content to seamlessly transition from the original playback rate to a new playback rate so that the time-based playback point is the same in both media contents at the time of cut-over. This allows varying the playback rate without creating jerkiness, missed portions of the media, duplicate portions of the media, or other motion artifacts.

Furthermore, the communication between the server and client device need not be completely customized for the user. This allows for high cache efficiency by keeping the responses for all users identical for the ranges of data being requested form the media files.

FIG. 1 is a block diagram illustrating an exemplary system in which a download agent dynamically selects media files from a media server. As illustrated in the example of FIG. 1, system 2 includes a client device 4. Client device 4 may be a wide variety of different types of devices. For example, client device 4 may be a personal computer, a laptop computer, a mobile telephone, a personal media player, a device integrated into a vehicle, a network telephone, a network television, a television set-top box, a network appliance, or another type of network device.

In addition, system 2 includes a media server 5 that is operated by a media content provider (MCP) 7. MCP 7 may be an enterprise or other organization that provides media content to client devices. For example, MCP 7 may be a corporation that runs a web site that allows users to post and share video clips.

Media server 5 is capable of providing multiple versions of a media asset. As used in this disclosure, a "media asset" is a set of media data that client device 4 can download and play back to user 18, for example a media file. Example media assets include video clips, audio clips, movies, live audio streams, live video streams, teleconference streams, telephone streams, digital cinema feeds, and other types of media. In the context of system 2, media server 5 may, for example, be capable of providing multiple versions of the same episode of a television show. The versions of the media asset may differ only in audio and/or video quality.

Each of the versions of the media asset may be associated with a different overall average playback rate. In general, the lower the playback rate of a media asset, the lower the quality of the media asset. For example, an audio object having a playback rate of 32 kbits/second (i.e., AM radio quality) may have lower audio quality than an audio object having a playback rate of 320 kbits/second (i.e., near CD quality).

Furthermore, media server 5 may also store the portion average playback rate value for each portion within the versions of the media asset. A media asset may be divided down into different portions based on a duration of a portion. The duration for each portion may be the same over the entire media asset, or the duration for each portion may vary over the media asset. A media asset may be encoded for an overall average playback rate; however, the playback rate for different portions within the media asset may be different than the overall average playback rate. The average playback rate for a portion, i.e. portion average playback rate, within the media asset may be greater than or less than the overall average playback rate. Media server 5 may store the portion average playback rate value for each portion of each version of the media asset. In some examples, media server 5 may store the portion average playback rate value as metadata within the versions of the media asset.

The portion average playback rate may be associated with a temporal range or a key frame range. For example, media server 5 may store the a first portion average playback rate value that is associated with one to thirty seconds, a second portion average playback rate value that is associated with thirty-one to sixty seconds, and so on. As another example, media server 5 may store a first portion average playback rate value associated with the first key frame to the second key frame, a second portion average playback rate value associated with the second key frame to the third key frame, and so on. As yet another example, media server 5 may store a first portion average playback rate value associated with the first key frame to the tenth key frame, a second portion average playback rate value associated with the eleventh key frame to the twentieth key frame, and so on. A portion of thirty seconds, every frame, or every ten frames are provided for purposes of illustration. In some examples, the portion may be every second. However, any portion is contemplated by this disclosure.

As illustrated in the example of FIG. 1, system 2 includes a network 8 that facilitates communication between client device 4 and media server 5. Network 8 may be a wide variety of different types of networks. For example, network 8 may be the Internet, a content-delivery network, a wide-area network, or another type of network. MCP 7 may purchase rights to communicate on network 8 from a network service provider. The network service provider may be an Internet Service Provider (ISP) or a similar organization.

In the example of FIG. 1, client device 4 includes a network interface 6, a memory 10, a processor 12, and a presentation unit 13. Network interface 6 facilitates communication between client device 4 and network 8. Network interface 6 may be a variety of different types of network interface. For example, network interface 6 may be an Ethernet interface, a WiFi interface, a token ring interface, a fiber optic interface, a Bluetooth interface, a Wireless Broadband interface, a WiMax interface, or another type of network interface. Memory 10 may be a computer-readable storage medium such as a Random Access Memory unit, a disk drive, an optical disc, a floppy disk, a Flash memory unit, or another type of computer-readable storage medium. Processor 12 may be a microprocessor that includes one or more cores, digital signal processors ("DSPs"), general purpose microprocessors, application-specific integrated circuits ("ASICs"), field programmable logic arrays ("FPGAs"), or other equivalent integrated or discrete logic circuitry. Accordingly, the term "processor," as used herein may refer to any of the foregoing structure or any other structure suitable for implementation of the techniques described herein.

Processor 12 may execute instructions stored in memory 10. When processor 12 executes instructions stored in memory 10, the instructions may cause processor 12 to perform one or more actions. Presentation unit 13 may be a computer monitor, a television set, an integrated video screen, speakers, digital signage, a video projector, or another type of unit capable of presenting media.

In the example of FIG. 1, memory 10 includes a media player 14 and a download agent 16. Media player 14 and download agent 16 may be sets of software instructions that, when executed cause processor 12 to perform various actions. For ease of explanation, when this disclosure states that media player 14 performs some action or states that download agent 16 performs some action, such phrases may be interpreted to mean that the instructions of media player 14 cause processor 12 to perform the action or to mean that the instructions of download agent 16 cause processor 12 to perform the action. However, it should be appreciated that in some implementations, media player 14 and/or download agent 16 may be implemented at least in part as hardware, in which case media player 14 and/or download agent 16 may perform some or all of the actions without any action by processor 12. Furthermore, it should be appreciated that in some implementations media player 14 and download agent 16 may be part of a common software package. In other words, the functionality of download agent 16 may be incorporated into media player 14.

A user 18 of client device 4 may interact with media player 14 when user 18 wants client device 4 to present a media asset. Example commercial media player applications include Windows Media Player™ from Microsoft Corporation of Redmond, Wash., Quicktime™ from Apple Computer of Cupertino, Calif., and Flash Video™ from Adobe Systems, Inc. of San Jose, Calif. User 18 may directly or indirectly instruct media player 14 to present a media asset. For example, user 18 may directly instruct media player 14 to present a media asset by inputting a Uniform Resource Locator associated with the media asset into a prompt presented by media player 14. In a second example, user 18 may indirectly instruct media player 14 to present a media asset by navigating a web browser application to a web page in which the media asset is embedded. In this second example, the web browser application may automatically instruct media player 14 to present the media asset.

When media player 14 is instructed to present a media asset, media player 14 may directly or indirectly instruct download agent 16 to retrieve the media asset. For example, media player 14 may use inter-process communication to directly instruct download agent 16 to retrieve the media asset. In another example, media player 14 may instruct an operating system of client device 4 to retrieve the media asset. In this example, the operating system may instruct download agent 16 to retrieve the media asset.

When download agent 16 is instructed to retrieve the media asset, download agent 16 may cause network interface 6 to output a playback rate request to a delivery information server 20 via network 8. The request may specify a resource identifier of the media asset. For example, download agent 16 may cause network interface 6 to output a Hypertext Transfer Protocol (HTTP) request that specifies a Uniform Resource Locator (URL) of the media asset. Delivery information server 20 may or may not be operated by MCP 7. For example, delivery information server 20 may be operated by a third party. In other words, delivery information server 20 may be operated by a service that is independent of MCP 7.

Delivery information server 20 may be configured to implement a data transfer policy established by MCP 7. The data transfer policy may indicate a desired overall bandwidth utilization during a transfer period of the version of the media asset. The desired overall bandwidth utilization is a bandwidth utilization rate that MCP 7 wants to maintain at a given point in time. For example, a data transfer policy may indicate that MCP 7 wants to maintain a bandwidth utilization of 100 megabytes/second. A data transfer policy may indicate that MCP 7 wants to maintain different bandwidth utilization at different times. For instance, a data transfer policy may indicate that MCP 7 wants to maintain a bandwidth utilization of 100 megabytes/second between the hours of 5:00 AM and 9:00 PM and maintain a bandwidth utilization of 90 megabytes/second between the hours of 9:00 PM through 4:59 AM.

When delivery information server 20 receives a request from client device 4 that indicates a media asset, delivery information server 20 may, in response to the request, select a version of the media asset from the versions of the media asset such that when MCP 7 transfers the version of the media asset at a throughput rate substantially equal to the playback rate associated with the version of the media asset, an anticipated overall bandwidth utilization of MCP 7 is substantially equal to a desired overall bandwidth utilization at all times during a transfer period of the version.

After delivery information server 20 selects the version of the media asset, delivery information server 20 may cause MCP 7 to transfer the selected version of the media asset. Delivery information server 20 may cause MCP 7 to transfer the selected version of the media asset in a variety of ways. For example, delivery information server 20 may send a message to client device 4 that directly or indirectly indicates the selected playback rate. When client device 4 receives the message from delivery information server 20, download agent 16 may cause network interface 8 to output a request to media server 5 for a version of the media asset having the selected playback rate. For example, delivery information server 20 may send a message to client device 4 that specifies the selected playback rate, thereby directly indicating the selected playback rate. In this example, download agent 16 may send a request to media server 5 that specifies a resource identifier of the media asset and the selected playback rate. In another example, delivery information server 20 may send a message to client device 4 that specifies a resource identifier associated with a version of the media asset having the selected playback rate.

In an alternative implementation, when download agent 16 is instructed to retrieve the media asset, download agent 16 may cause network interface 6 to output a request for the media asset to media server 5. The request may specify a resource identifier of the media asset. When media server 5 receives the request, media server 5 may send a request to delivery information server 20 for a playback rate of the requested media asset. In response, delivery information server 20 may select a playback rate of the requested media asset and send a playback rate of the requested media asset to media server 5. Media server 5 may then send a version of the requested media asset having the selected playback rate to client device 4.

In some examples, delivery information server 20 may not be needed. In such examples, download agent 16 may transmit a request for a media asset directly to media server 5 via network 8. Media server 5 may select the version of the media asset based on an established throughput rate to client device 4. For example, after media server 5 receives a request for a media asset, media server 5 may perform some form of "handshaking" with client device 4 to determine a throughput rate to client device 4. Media server 5 may select the version of the media asset based on the determined throughput rate. The selected version of the media asset may be encoded for an overall average playback rate that is substantially similar, but less than, the determined throughput rate.

The selection of the media asset based on delivery information server 20 or some form of handshaking are merely examples. Media server 5 may select a version of the media asset based on any technique known in the art. This disclosure is not limited to the technique used to initially select the version of the media asset that is provided to client device 4.

As described herein, download agent 16 is capable of dynamically selecting and transitioning between different playback rates for delivery of the requested media asset provided by media server 5. For example, download agent 16 is capable of dynamically interrupting download and playback of the media asset at the currently selected overall average playback rate representation and initiating download of the same media asset at a different overall playback rate representation, i.e. dynamically interrupt download and playback of a first media asset and initiate download of a second media asset which contains substantially similar content as the first media asset. In some examples, download agent 16 may dynamically select and transition to a different playback rate representation when an average playback rate for a portion of the media asset, i.e. portion average playback rate, is greater than the throughput rate. Download agent 16 may transition to the different playback representation for the portion where the portion average playback rate is greater than the throughput rate and transition back to the originally selected playback rate representation after downloading the portion from the different playback rate representation.

Download agent 16 forecasts and initiates the switch of the playback rate presentation for the media asset such that seamless transition occurs from the current playback rate representation of the media asset to the new playback rate representation of the media asset at the same time-based playback point within both representations. As a result, the transition is seamless to the end-user 18 without introducing delay or jitter and without requiring restart of the content delivery for the selected media asset. Moreover, the client-side initiation of the dynamic transition by download agent 16 between the different playback rate representations may avoid any requirement that the client device 4 report download and playback quality to delivery information server 20 or media server 5.

Figure 2:
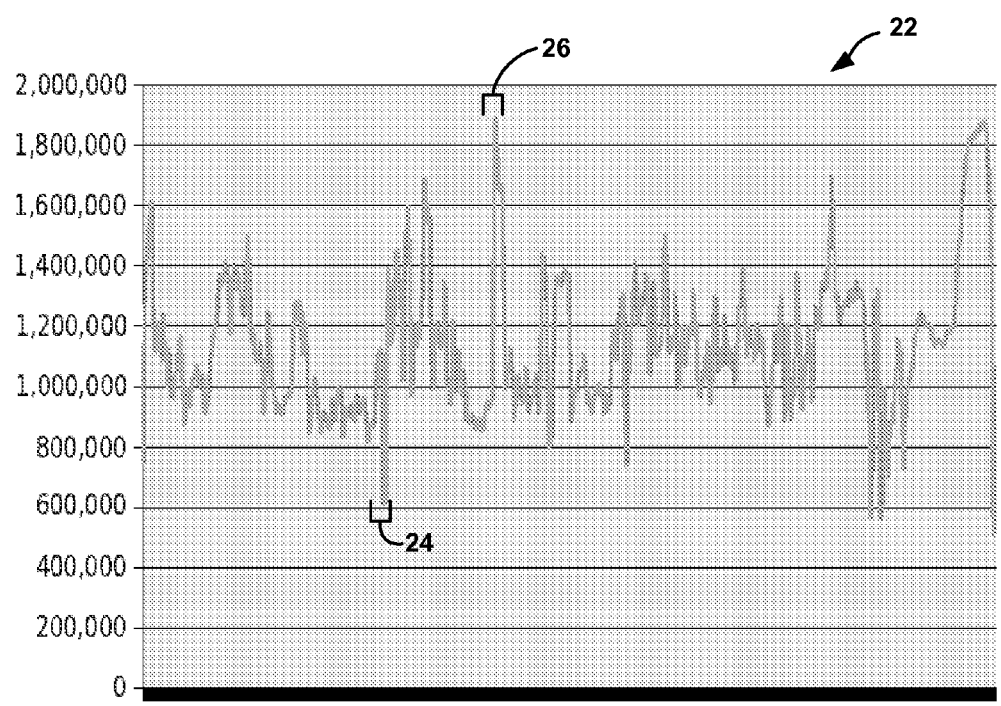
FIG. 2 is a graph illustrating an example playback rate of a media asset.

FIG. 2 is a graph illustrating an example playback rate of media asset 22. Media asset 22 is encoded for an overall average playback rate of 1.2 Mbps. However, as seen in FIG. 2, the playback rate may be greater or less than the overall average playback rate, e.g. 1.2 Mbps, at different portions within media asset 22. For example, at portion 24 the playback rate is down to 0.6 Mbps, almost half the overall average playback rate. At portion 26, the playback rate is greater than 1.8 Mbps, more than 50% greater than the overall average playback rate. Portion 26 may be of more importance than portion 24. If client device 4 is downloading media asset 22 at a throughput rate of 1.2 Mbps, client device 4 may receive portion 24 without any problems since the portion average playback rate at portion 24 is less than the throughput rate. However, client device 4 may have problems receiving portion 26 since the portion average playback rate at portion 26 is greater than the throughput rate.

Download agent 16 (FIG. 1) may receive the portion average playback rate values as metadata within the media asset, or may separately receive the portion average playback rate values from server 5. In accordance with this disclosure, download agent 16 may forecast a dynamic transition to a different version of media asset 22 at portion 26 since the portion average playback rate is greater than the throughput rate at portion 26. Download agent 16 may transition from a key frame of the current playback rate representation of the media asset to a key frame that represents the same time-based playback point of the different playback rate representation. The portion average playback rate of the selected media asset representation may be less than the throughput rate.

Figure 3:
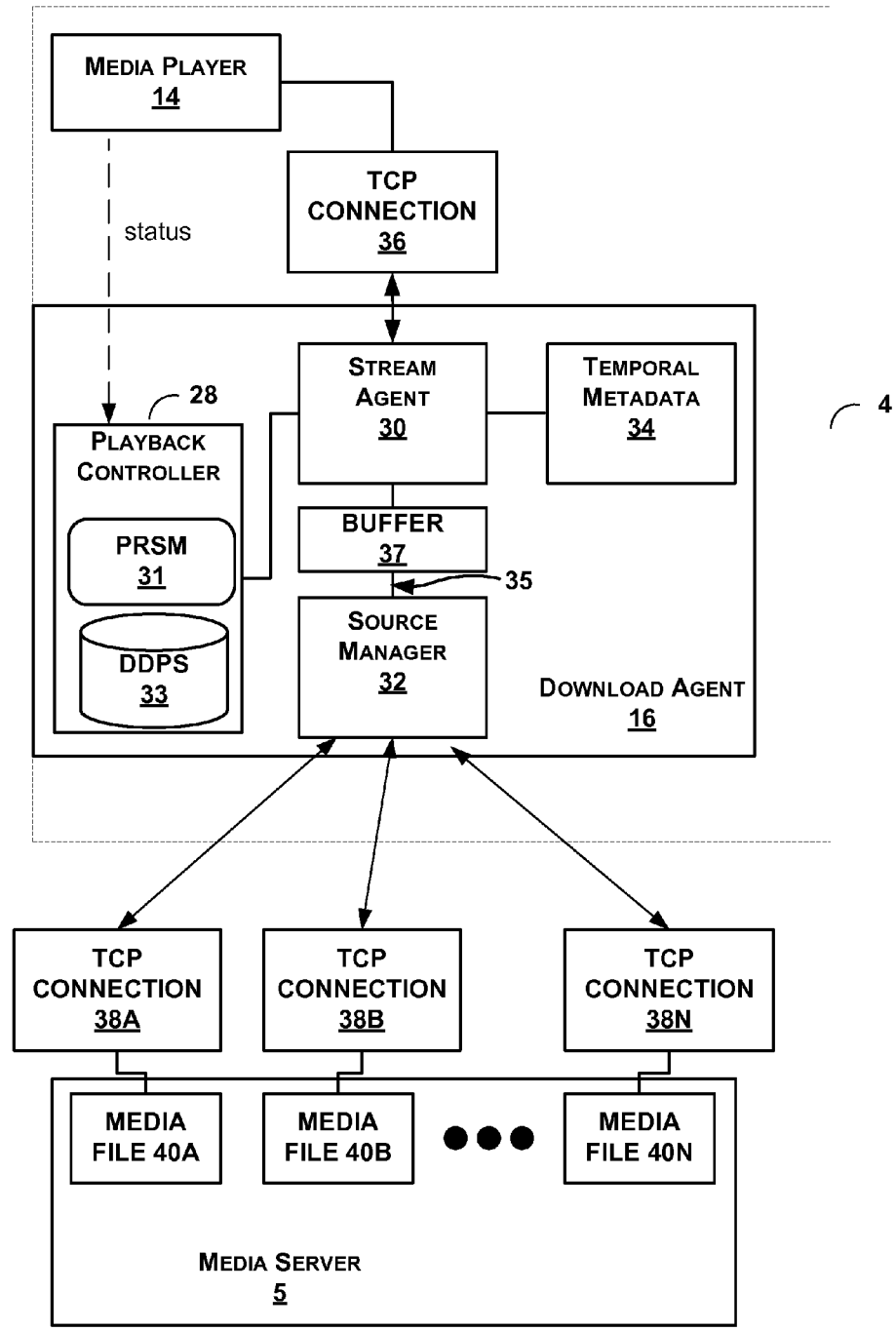
FIG. 3 is a block diagram illustrating an exemplary download agent 16 connected to a media server 5.

FIG. 3 is a block diagram illustrating an exemplary download agent 16 connected to a media server 5. For clarity, the other components on client device 4 have been omitted to show the relationship between download agent 16 and media server 5. In the example embodiment, download agent 16 includes playback controller 28, stream agent 30, source manager 32, temporal metadata 34, and buffer 37. For purposes of example, buffer 37 is shown as part of download agent 16. However, in some examples, buffer 37 may be external to download agent 16, but may be a part of memory 10. In some examples, buffer 37 may not be part of memory 10, but instead its own memory unit, e.g., internal cache. For purpose of example, media player 14 is shown as external to download agent 16, however, as described above, download agent 16 may encapsulate media player 14. In such examples, buffer 37 may be considered a part of media player 14.

As shown in FIG. 3, download agent 16 provides content to media player 14 via a single TCP connection 36 internal to client device 4. Download agent 16 may, for example, open and maintain a single socket connection for communication of downloaded media content to media player via TCP connection 36. In this example, TCP connection 36 may be a standard transmission control protocol (TCP) connection used in Open Systems Interconnection Basic Reference Model (OSI). TCP connection 36 remains constant between media player 14 and download agent 16 regardless of the playback rate representation(s) of a particular media asset that are being downloaded by download agent 16; download agent seamlessly splices the different playback rates of the media asset onto TCP connection 36 so that media player 14 is unaware of any dynamic playback rate switches selected by download agent 16.

Media server 5 may include a plurality of media files 40A-40N (herein referred to as "media files 40") that generally represents exemplary media assets. Media files 40 may each contain similar content (e.g., the same movie), but at different encoding quality, i.e. the overall average playback rates are different. As shown in FIG. 3, download agent 16 may initiate and establish a plurality of different TCP connections 38A-38N (herein referred to as "TCP connections 38") through network 8 for downloading one or more of media files 40 from media server 5.

In general, source manager 32 handles connection management for access and retrieval of data from media files 40 within media server 5. Source manager 32 handles all specific implementation details necessary for acquiring the media data and providing the data to stream agent 30. In this example, source manager implements a plurality of TCP network stacks and may concurrently handle multiple TCP connections 38 to media server 5. Source manager 32 de-multiplex the input data streams from media files 40 as directed by stream agent 30. For example, source manager 32 via network interface 6 (FIG. 1) receives one of media files 40 from media server 5 at the established throughput rate of client device 4. In some examples, as source manager 32 receives one of media files 40, source manager 32 stores data of the received one of media files 40 into buffer 37.

Initially, buffer 37 is empty. After source manager 32 starts to receive one of media files 40 from server 5, source manager 32 provides the data of the one of media files 40 to buffer 37. As buffer 37 receives data, buffer 37 starts to accrue data. As described in more detail below, in some examples, after some initial amount of time, stream agent 30 receives data from buffer 37 at the playback rate of the one of media files 40. Accordingly, if the playback rate is greater than the throughput rate, then the initial data accrued in buffer 37 depletes, and may deplete to a point where buffer 37 includes no data. As buffer 37 depletes, the user 18 of client device 4 may experience rebuffering delays as buffer 37 accrues more data. In accordance with this disclosure, source manager 32 may dynamically switch from one of media files 40 where the portion average playback rate is greater than the throughput rate for a portion to another one of media files 40 where the portion average playback rate is less than or equal to the throughput rate for that portion. In this manner, buffer 37 may not deplete to a point where there is no data in buffer 37 because the playback rate may be less than or equal to the throughput rate. Therefore, download agent 16 may not require rebuffering which enhances the viewing experience for user 18 because the rebuffering delays are reduced or eliminated.

Media files 40 may each have similar content, such as the same movie, real-time data stream or other media, but the overall average playback rate may vary. For example, media file 40A may be encoded for an overall average playback rate of 1 Mbps, media file 40B may encoded for an overall average playback rate of 2 Mbps, and media file 40N may be encoded for an overall average playback rate of 3 Mbps.

In the context of video, each of media files 40 typically contains a plurality of video frames encoded in accordance with a video compression scheme. One type of frame is referred to as a key frame or intra picture that can be decoded without reference to other frames and may, for example, provide an entire encoded picture. The term "key frame" is used herein to generally refer to this type of frame within an encoded media stream. In the context of H.264 coding, key frames are referred to as "i-frames." Between each key frame are predicted pictures or bi-predicted pictures that generally contain image data and motion vector displacements that are relative to the previous key frame in the media file. Download agent 16 coordinates and initiates dynamic transition such that the cut-over between playback rates from one of media files 40 to another occurs at a video frame that is not dependent on other video frames within the stream, i.e., a key frame. Each key frame may be associated with a timestamp. A timestamp is the temporal location of the key frame, i.e. the amount of time the media file is played before it reaches the key frame. The various frames may be represented by digital bits. Client device 4 downloads the digital bits of the media files 40. The digital bits may be considered as video data.

In general, stream agent 30 is responsible for serializing disparate streams of media files 40 into a valid output stream for delivery to media player 14 via TCP connection 36 while additionally performing any required transformations to the stream data in the form of dynamic playback rate transitions. For example, stream agent 30 may decode, e.g., decompress, the media content of the media file of media files 40 that is currently being downloaded. Stream agent 30 may receive the media content of one of media files 40 from buffer 37 at the playback rate of that one of media files 40. As described, in some examples, the playback rate at various portions within each one of media files 40 may be different. Accordingly, stream agent 30 may receive the various portions at different playback rates.

As one non-limiting example, upon an initial request by user 18 to download a particular media asset, stream agent accesses all of the respective media files 40 having different playback rate representations of the media asset and downloads metadata contained within a first segment of each of the media files. For example, the metadata within each of media files 36 may indicate that video frames in the media object are encoded in accordance with the H.264 format and are to be presented at a rate of 35 frames per second. In addition, the metadata may indicate other data such as copyright information, whether the media is to be presented in black and white, information that identifies an artist associated with the media object, and other information. In addition, the metadata contained within each of media files 40 includes a key frame list that indicates byte indexes associated with key frames for the respective media file. The metadata may also include the overall average playback rate. Moreover, in some examples the metadata may include the portion average playback rate value for each portion of media files 40. Alternatively, in some examples, server 5 may store the portion average playback rate value for each portion of media files 40. In such examples, stream agent 30 may download the portion average playback rate from server 5.

Based on the downloaded metadata, temporal metadata 34 correlates timestamps for key frames for the different media files 40 to byte offsets in the various media file formats. For example, temporal metadata 34 may be arranged as an array or other data structure that identifies sets of key frames having substantially similar time offsets within the media to be presented (e.g., a first set of key frames having a key frame selected from each of the media files at approximately 3 seconds of playback, a second set of key frames associated with approximately 7 seconds of playback, and the like). Temporal metadata 34 then correlates the key frames of each of the sets to appropriate byte offsets within media files 40. In this way, the byte offsets within media files for temporally proximate key frames are correlated and stored within temporal metadata 34. An example technique for correlating the time stamps to key frames is provided in application Ser. No. 12/252,782, entitled "MEDIA PLAYBACK POINT SEEKING USING DATA RANGE REQUESTS," filed Oct. 16, 2008, which claims priority to 60/981,164, filed Oct. 19, 2007, the entire contents of each is incorporated herein by reference.

In some embodiments, temporal metadata 34 may not be part of download agent 16. Instead temporal metadata 34 may reside on either media server 5 or delivery information server 20. In these embodiments, download agent 16 may receive a list of key frames for each one of media files 40 from media server 5 or delivery information server 20. Additionally, media server 5 or delivery information server 20 may correlate the byte offsets within media files 40 for temporally proximate key frames for media files 40.

Stream agent 30 interacts with source manager 32 to request data from specific portions of media files 40 and blends data from the disparate streams of media files 40 into a valid output stream 35 while performing any required transformations to the stream data. For example, source manager 32 may request particular segments of media files 40 and extract the application-layer media data from each media file for placement into a respective "container." Stream agent 30 may then interact with the appropriate software container of source manager 32 to retrieve the appropriate media data. Stream agent 30 may be preprogrammed to perform actions on specific media file formats such as Flash Format (FLU) used by Adobe Flash Player, provided by Adobe Systems, Inc., Advanced System Format (ASF) used by Windows Media Player, provided by Microsoft Inc., or other media file formats. Stream agent 30 may also ensure that download from each media file 40 is forecasted based on conditions and that the resultant data stream are stitched together at temporally correlated key frames. In this manner, user 18 viewing media player 14 may be oblivious to the automated functions of download agent 16.

Playback controller 28 provides high-level control logic to determine what actions should take place based on various conditions, including portion average playback rate, environmental, buffered data in view of tolerances, throughput rate, utilization of computing resources of client device 4, bandwidth pricing, and the like. Based on these inputs, playback controller 28 provides playback rate guidance to request stream agent 30 to select a higher or lower playback rate media file 40.

Playback controller 28 may scan portion average playback rate values stored as metadata in media files 40 or downloaded separately from media server 5. Playback controller 28 may identify a location of a portion of data where the portion average playback rate is greater than the throughput rate for the current one of media files 40 that is being downloaded. After identifying the portion where the portion average playback rate value is greater than the throughput rate, playback controller 28 provides the identified location to stream agent 30. Additionally, playback controller 28 may also determine which one of the different media files stream agent 30 should transition to, and provide that information to stream agent 30. Before the portion where the portion average playback rate is greater than the throughput rate is played by media player 14, playback controller 28 may instruct stream agent 30 to transition from the current one of media files 40 to the determined one of media files 40.

There may be at least two techniques that playback controller 28 may employ to determine which one of the media files 40 stream agent 30 should transition to when the portion average playback rate is greater than the throughput rate. In a first non-limiting technique, playback controller 28 determines a ratio of the portion average playback rate and the overall average playback rate of the current one of media files 40 that is being currently downloaded. Based on the calculated ratio, playback controller 28 determines which one of media files 40 stream agent 30 should download from when the portion average playback rate is greater than the throughput rate. Playback controller 28 may divide the overall average playback rate for the current one of media files 40 by the calculated ratio. Stream agent 30 may dynamically transition to one of media files 40 that most closely matches the overall average playback rate divided by the calculated ratio at the location identified by playback controller 28.

For example, assume client device 4 is downloading media file 40A. The overall average playback rate of media file 40A is 1.2 Mbps, the throughput rate is 1.2 Mbps, and the identified portion average playback rate is 1.8 Mbps. Further the identified portion where the portion average playback rate is greater than the throughput rate occurs at sixty minutes after playback and lasts until sixty minutes and thirty seconds. Playback controller 28 may determine a value for the identified portion average playback rate divided by the overall average playback rate, i.e. 1.8 Mbps divided by 1.2 Mbps which equals 1.5. Playback controller 28 may then divide the throughput rate by 1.5, i.e. 1.2 Mbps divided by 1.5 which equals 0.8 Mbps. In this example, media file 40B is encoded for an overall average playback rate that is substantially close to 0.8 Mbps. Playback controller 28 may then instruct stream agent 30 to transition to one of media files 40 that is encoded for an overall average playback rate substantially close to 0.8 Mbps, i.e. media file 40B, for the duration of sixty minutes to sixty minutes and thirty seconds, and then transition back to the media file 40A.

In examples where media file 40A and 40B are encoded in a substantially similar manner, e.g. both are encoded in an H.264 format, a ratio of an average playback rate over a portion and the overall average playback rate may be constant. Keeping with the previous example, as described from sixty minutes to sixty minutes and thirty seconds the portion average playback rate is 1.8 Mbps for media file 40A encoded for a playback rate of 1.2 Mbps. A media file containing the same media content as media file 40A, e.g. media file 40B, that is encoded in a substantially similar manner may provide the same ratio of the portion average playback rate to the overall average playback rate. Stated another way, in media file 40A the ratio of the portion average playback rate and overall average playback rate from sixty minutes to sixty minutes and thirty seconds is 1.5, i.e. 1.8 Mbps divided by 1.2 Mbps. In media file 40B the ratio of the portion average playback rate and overall average playback rate from sixty minutes to sixty minutes and thirty seconds may also be 1.5. Accordingly, the portion average playback rate from sixty minutes to sixty minutes and thirty seconds for media file 40B can be calculated by multiplying 1.5 by the overall average playback rate, i.e. 1.5 multiplied by 0.8 Mbps which is 1.2 Mbps. As before, the various playback rates, throughput rates, and duration of the portion of a media file are all provided for purposes of illustration only. This disclosure contemplates any possible values for the playback rates, throughput rates, and duration of the portion of the media file.

Instead of or in addition to applying ratios to determine which media file stream agent 30 should transition to, playback controller 28 may employ a second technique of determining which media file stream agent 30 should transition to when the portion average playback rate is greater than the throughput rate. After identifying a location and portion where the portion average playback rate is greater than the throughput rate, playback controller 28 may scan the portion average playback rate for each portion within each one of media files 40. As described above, the portion average playback rate for each portion within each one of media files 40 may be embedded as metadata or may be separately downloaded from media server 5. Playback controller 28 may select the media file where the portion average playback rate is the highest, but less than the throughput rate.

Where media files 40 are encoded in a different format, in some examples it may be possible that the ratio of the portion average playback rate and the overall average playback rate may be different for different media files 40. As a non-limiting example assume there are only two media files 40, media file 40A and media file 40B. Also assume that media file 40B is encoded for a playback rate that is less than media file 40A. Media file 40A is encoded using a VP6-F format and media file 40B is encoded using a VP6-E format. Generally, a VP6-F format is less computationally extensive compared to VP6-E format. It may be possible that the ratio of the portion average playback rate for a certain portion, e.g. sixty minutes to sixty minutes and thirty seconds, and the overall average playback rate may be different for media file 40A and media file 40B. In such instances, playback controller 28 may scan the portion average playback rate values for media file 40B over the desired portion, e.g. sixty minutes to sixty minutes and thirty seconds. If the portion average playback rate is less than the throughput rate, playback controller 28 may instruct stream agent 30 to dynamically transition from media file 40A to media file 40B from sixty minutes to sixty minutes and thirty seconds, and then transition back to media file 40A.

As described above, playback controller 28 may instruct stream agent 30 to transition to a determined one of media files 40 before the portion where the portion average playback rate is greater than the throughput rate is played by media player 14. In some examples, playback controller 28 may account for media content data that is already buffered within media player 14 to determine whether stream agent 30 should transition to one of media files 40 when the portion average playback rate is greater than the throughput rate. Download agent 16 may buffer a certain amount of the media content from a media file, and store it in an internal cache, e.g., buffer 37. In some examples, playback controller 28 accounts for the amount of data buffered in buffer 37 when determining whether stream agent 30 should transition to one of media files 40. If there is enough data buffered within buffer 37, playback controller 28 may not instruct stream agent 30 to transition to one of media files 40 even though the portion average playback rate is greater than the throughput rate. The determination of whether there is enough data buffered within media player 14 may be based on the portion average playback rate, the throughput rate, and the duration of the portion where the portion average playback rate is greater than the throughput rate.

Playback controller 28 may subtract the throughput rate from the portion average playback rate where the portion average playback rate is greater than the throughput rate. Playback controller 28 may then multiply the result with the duration of the portion where the portion average playback rate is greater than the throughput rate. If the resulting value is less than the amount of data buffered in media player 14, playback controller 28 may not instruct stream agent 30 to transition to a different one of media files 40. If the resulting value is greater than the amount of data buffered in media player 14, playback controller 28 may instruct stream agent 30 to transition to a different one of media files 40.

For example, assume the throughput rate is 1 Mbps, the portion average playback rate is 3 Mbps, and the duration where the portion average playback rate is greater than the throughput rate is 10 seconds. In accordance with this disclosure, playback controller 28 may subtract the throughput rate from the portion average playback rate, i.e. 3 Mbps minus 1 Mbps which is 2 Mbps. Playback controller 28 may then multiply the result of the subtraction by the duration of the throughput rate, i.e. 2 Mbps multiplied by 10 seconds which is 20 megabits. If the amount of data buffered by buffer 37 is greater than 20 megabits, playback controller 28 may not instruct stream agent 30 to transition to a different one of media files 40 even thought the portion average playback rate is greater than the throughput rate for 10 seconds. Playback controller 28 may not instruct stream agent 30 to transition to a different one of media files even though the portion average playback rate is greater than the throughput rate because buffer 37 has already buffered enough data that media player 14 can withstand the 10 second duration where the portion average playback rate is greater than the throughput rate without needing to pause to buffer more data. If on the other hand, buffer 37 has buffered less than 20 megabits, playback controller 28 may instruct stream agent 30 to transition to a different one of media files 40 because buffer 37 does not have enough data already buffered to withstand the 10 second duration where the portion average playback rate is greater than the throughput rate.

To reiterate, as described above, playback controller 28 determines a location and duration within a current media file where the portion average playback rate is greater than the throughput rate. The location and duration may be determined based on the metadata of media files 40 or may be separately downloaded from media server 5. Playback controller 28 also determines which one of media files 40 stream agent 30 should transition to when the portion average playback rate is greater than the throughput rate. Playback controller 28 may employ at least two techniques to determine which one of media files 40 stream agent 30 should transition to. In a first technique, playback controller 28 employs various ratios to determine which file stream agent 30 should transition to. In a second technique, playback controller 28 scans the metadata of media files 40 or data separately downloaded from media server 5 to find which file stream agent 30 should transition to. Stream agent 30 transitions to a different one of media files 40 based on an instruction from playback controller 28 to transition to a different one of media files 40. In some examples, playback controller 28 accounts for the amount of data buffered in buffer 37 when determining whether stream agent 30 should transition to a different one of media files 40.

After receiving an instruction from playback controller 28 to transition to a different one of media files 40, stream agent 30 finds the appropriate frame to transition to within the different one of media files 40 based on the data stored in temporal metadata 34. For example, if playback controller 28 instructs stream agent 30 to transition from media file 40A to media file 40B at thirty minutes for a duration of ten seconds, and then transition back to media file 40A at thirty minutes and ten seconds, stream agent 30 finds the appropriate key frames within media file 40B that are most closely correlated to thirty minutes and thirty minutes and ten seconds based on the data stored in temporal metadata 34. Stream agent 30 may transition from media file 40A to media file 40B and back to media file 40A at the appropriate key frames.

In one example implementation, playback controller 28 may include a playback rate selection module (PRSM) 31 that maintains a data delivery policy storage module (DDPS) 33. Although illustrated as located within client device 4, PRSM 31 and DDPS 33 may be located remote from the client device, such as within media server 5 or delivery information server 20. In some instances, PRSM 31 aids playback controller 28 in the selection of the version of the media asset from the available versions of the media asset, i.e., the different media files 40 in the example of FIG. 3. Data delivery policy storage 33 may store a wide variety of data delivery policies that serve a wide variety of business purposes. Though PRSM 31 and DDPS 33 are shown in FIG. 3, in some examples PRSM 31 and DDPS 33 may not needed, i.e. may not be located within client device 4 or media server 5. Further as explained above, in some examples delivery information server 20 may not be needed, accordingly in such examples, PRSM 31 and DDPS 33 may not be located within delivery information server 20.

As described above, playback controller 28 selects which one of media files 40 stream agent 30 should transition to based on a portion average playback rate. In some examples, in addition to selecting which one of media files 40 stream agent should transition to based on a portion average playback rate, playback controller 28 may also select which one of media files 40 stream agent 30 should transition to based on a data delivery policy stored in DDPS 33 executed by PRSM 31. Examples of data delivery policy are disclosed in application ser. No. 61/073,542, entitled "DYNAMIC MEDIA BIT RATES BASED ON ENTERPRISE DATA TRANSFER POLICIES," filed Jun. 18, 2008, the entire contents of which is incorporated herein by reference.

The techniques described above describe transitioning from one media file to another. Additional examples for transitioning from one media file to another is provided in application Ser. No. 60/992,471, entitled "DYNAMIC BIT RATE SCALING," filed Dec. 5, 2007, the entire contents of which is incorporated herein by reference. Further, in some examples, each of the media files 40 may contain live data. Examples for allowing client device 4 to download live data are provided in application Ser. No. 61/052,459, entitled "LIVE MEDIA DELIVERY OVER A PACKET-BASED COMPUTER NETWORK," filed May 12, 2008, the entire contents of which is incorporated herein by reference. Furthermore, in some examples, client device 4 may swarm the data from one or more servers, i.e. download the media files in parallel from one or more media servers 5. Examples of swarming and downloading media files in parallel are provide in U.S. Pat. No. 7,277,950, entitled "APPARATUS, METHOD AND SYSTEM FOR AN ACKNOWLEDGEMENT INDEPENDENT EQUALIZED DATA PACKET TRANSFER MECHANISM OVER A PEER TO PEER NETWORK," issued Oct. 2, 2007 and application Ser. No. 10/788,695, entitled "PARALLEL DATA TRANSFER OVER MULTIPLE CHANNELS WITH DATA ORDER PRIORITIZATION," filed Feburary 27, 2004, the contents of each is incorporated herein by reference.

Figure 4:
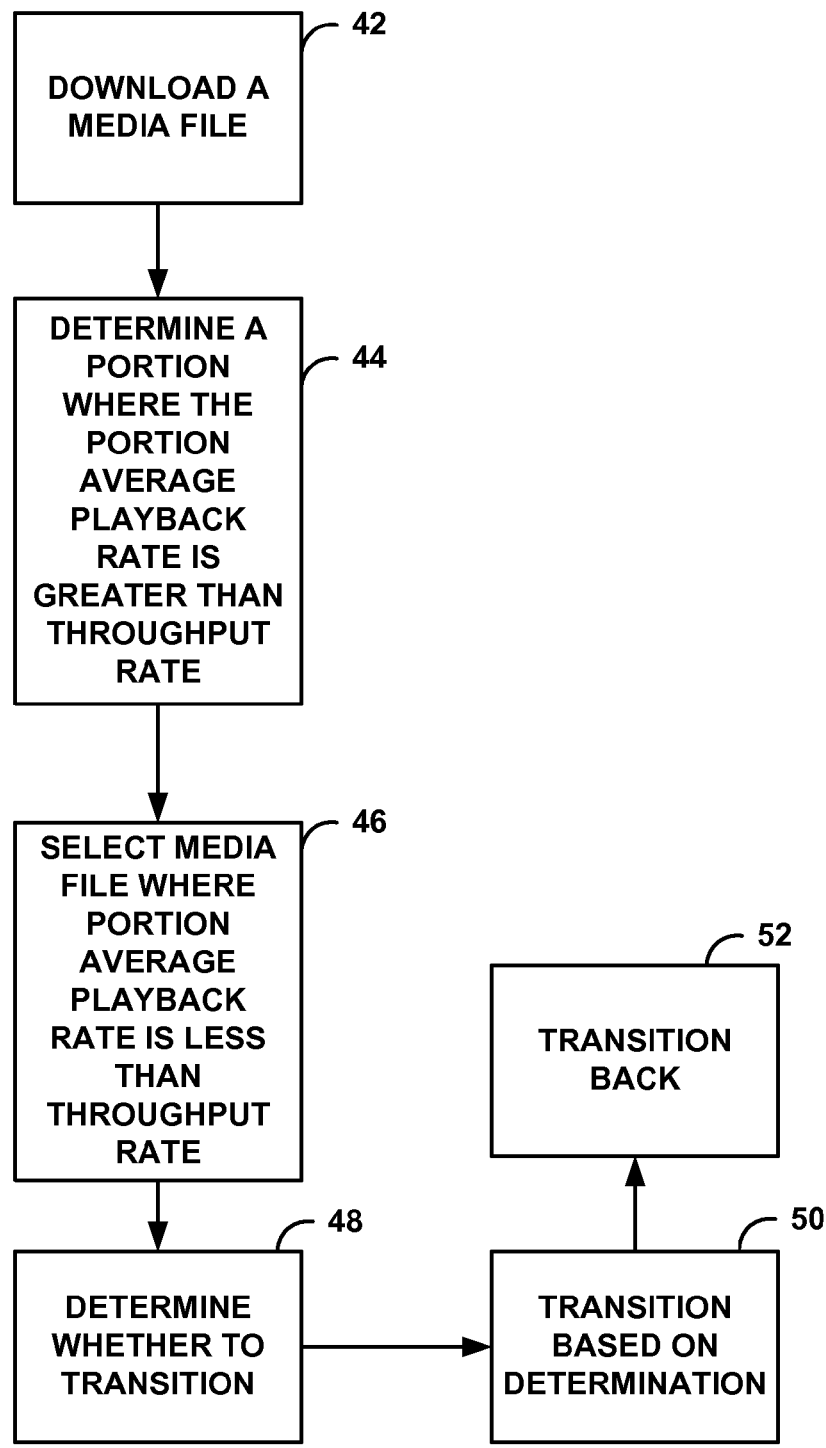
FIG. 4 is a flowchart illustrating an example operation of the download agent.

FIG. 4 is a flowchart illustrating an example operation of download agent 16. For purposes of illustration reference will be made to FIGS. 1 and 3. Download agent 16 downloads a media file from media server 5 (42). The media file to be downloaded may be selected in various manners. As one example, download agent 16 may transmit a request to media server 5 to provide a media file, media server 5 in response may select the media file that is encoded for an overall average playback rate that is substantially close to the throughput rate. Alternatively, media server 5 may randomly select a media file and transmit that media file to download agent 16. As another example, download agent 16 may query delivery information server 20 for a particular desired playback rate. Delivery information server 20 may then respond to download agent 16 with the desired playback rate. Download agent 16 may then request a media file encoded for an overall average playback rate that is substantially close to the desired playback rate. Alternatively, delivery information server 20 may provide the desired playback rate to media server 5 and in response media server 5 may transmit a media file to download agent 16 that is encoded for an overall playback rate that is substantially close to the desired playback rate. The previous techniques for selecting a media file to be transmitted to download agent 16 is provided merely for illustration purposes, and should not be considered limiting. Any technique known in the art may be employed to select a media file to be transmitted to download agent 16.

Next, playback controller 28 within download agent 16 determines a location within the selected media file where the portion average playback rate is greater than the throughput rate (44). The throughput rate may be determined by playback controller 28. Playback controller 28 may determine the location where the portion average playback rate is greater than the throughput rate by scanning the metadata within the media file to find portion average playback rate values that are correlated to temporal locations within the media file. Alternatively, playback controller 28 may separately receive, i.e. in examples where the portion average playback rate values are not embedded as metadata, the portion average playback rate values correlated to temporal locations within the media file. If there is no portion where the portion average playback rate is greater than the throughput rate, download agent 16 keeps downloading the media file without any need to transition to a different media file.

Playback controller 28 then selects a different media file, i.e. different than the current media file that is being downloaded by download agent 16, where the portion average playback rate is less than the throughput rate for the determined location (46). Techniques for selecting the different media file are provided in more detail with respect to FIGS. 5 and 6.

As the identified location where the portion average playback rate is greater than the throughput rate approaches, playback controller 28 determines whether to transition to the selected different media file (48). In some examples, this step may not be necessary. In such examples, playback controller 28 does not determine whether or not to transition to the selected different media file. Instead, playback controller 28 may always transition to the selected different media file and download media content from the selected different media file where the portion average playback rate is greater than the throughput rate. In some examples, playback controller 28 may determine whether or not to transition to the selected different media file based on the amount of data buffered in buffer 37. An example technique of determining whether to transition to the selected different media file is provided in more detail with respect to FIG. 7.

Playback controller 28 instructs stream agent 30 to dynamically transition to the selected different media file based on the determination made in step 48 (50). Playback controller 28 may instruct stream agent 30 to transition to the selected different media file for the duration of the portion where the portion average playback rate is greater than the throughput rate in the current media file. Stream agent 30 in response transitions to the selected media file at a key frame that correlates to a timestamp of the location of the portion where the portion average playback rate is greater than the throughput rate. Stream agent 30 finds the key frame that correlates to the timestamp based on the data stored in temporal metadata 34. After download agent 16 downloads the portion where the portion average playback rate is greater than the throughput rate from the selected different media file, playback controller 28 instructs stream agent 30 to dynamically transition back from the selected different media file to the original media file. Stream agent 30 transitions back at a key frame based on the timestamp data stored in temporal metadata 34.

Figure 5:
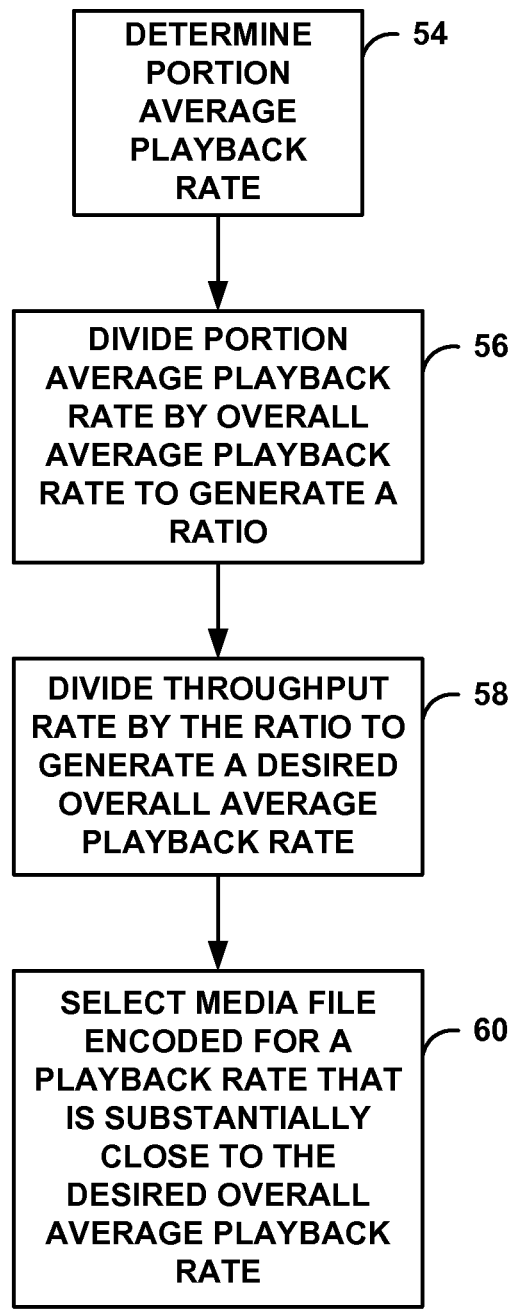
FIG. 5 is a flowchart illustrating a first example technique of selecting a media file.

FIG. 5 is a flowchart illustrating a first example technique of selecting a media file. For purposes of illustration reference will be made to FIG. 3. The example technique described in FIG. 5 is after playback controller 28 has already determined that there is a portion within the current media file where the portion playback rate is greater than the throughput rate. Initially, playback controller 28 determines the portion average playback rate for the portion where the portion average playback rate is greater than the throughput rate (54). Playback controller 28 may determine the portion average playback rate value based on metadata stored in the current file or separately downloaded from media server 5.

After determining the portion average playback rate for the portion where the portion average playback rate is greater than the throughput rate, playback controller divides the portion average playback rate by the overall average playback rate of the current media file to generate a ratio of the playback rates (56). The overall average playback rate may be stored as metadata within the current media file. Next, playback controller 28 divides the throughput rate by the ratio of the playback rates to generate a desired overall average playback rate (58). Playback controller 28 then selects a media file that is encoded for an overall average playback rate that is substantially close to the desired overall average playback rate (60). Though not limited to this scenario, the technique described with respect to FIG. 5 may be beneficial in examples where each of the media files is encoded in the same format, e.g. H.264.

Figure 6:
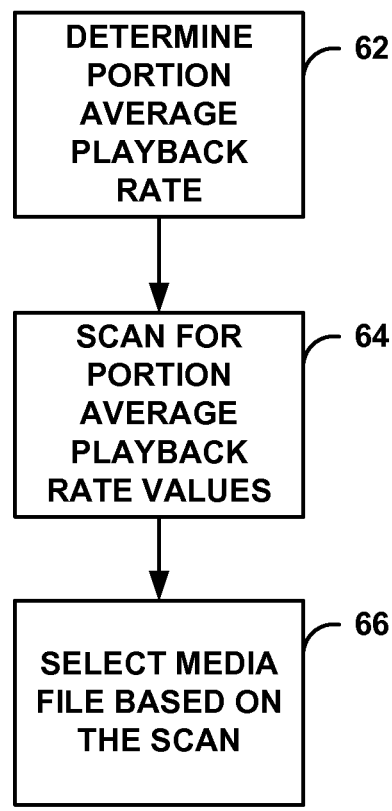
FIG. 6 is a flowchart illustrating a second example technique of selecting a media file.

FIG. 6 is a flowchart illustrating a second example technique of selecting a media file. For purposes of illustration reference will be made to FIG. 3. The example technique described in FIG. 6 is after playback controller 28 has already determined that there is a portion within the current media file where the portion playback rate is greater than the throughput rate. Initially, playback controller 28 determines the portion average playback rate for the portion where the portion average playback rate is greater than the throughput rate (62). Playback controller 28 may determine the portion average playback rate value based on metadata stored in the current file or separately downloaded from media server 5.

Next playback controller 28 scans the portion average playback rate values for each media file for the portion where the portion average playback rate is greater than the playback rate (64). Playback controller 28 may scan the metadata for each media file to the portion average playback rate values, or alternatively, separately receive the portion average playback rate values for each portion for each file from media server 5. Based on the portion average playback rate values, playback controller 28 selects the media file where the portion average playback rate is the highest for the determined portion, but less than the throughput rate (66).

Figure 7:
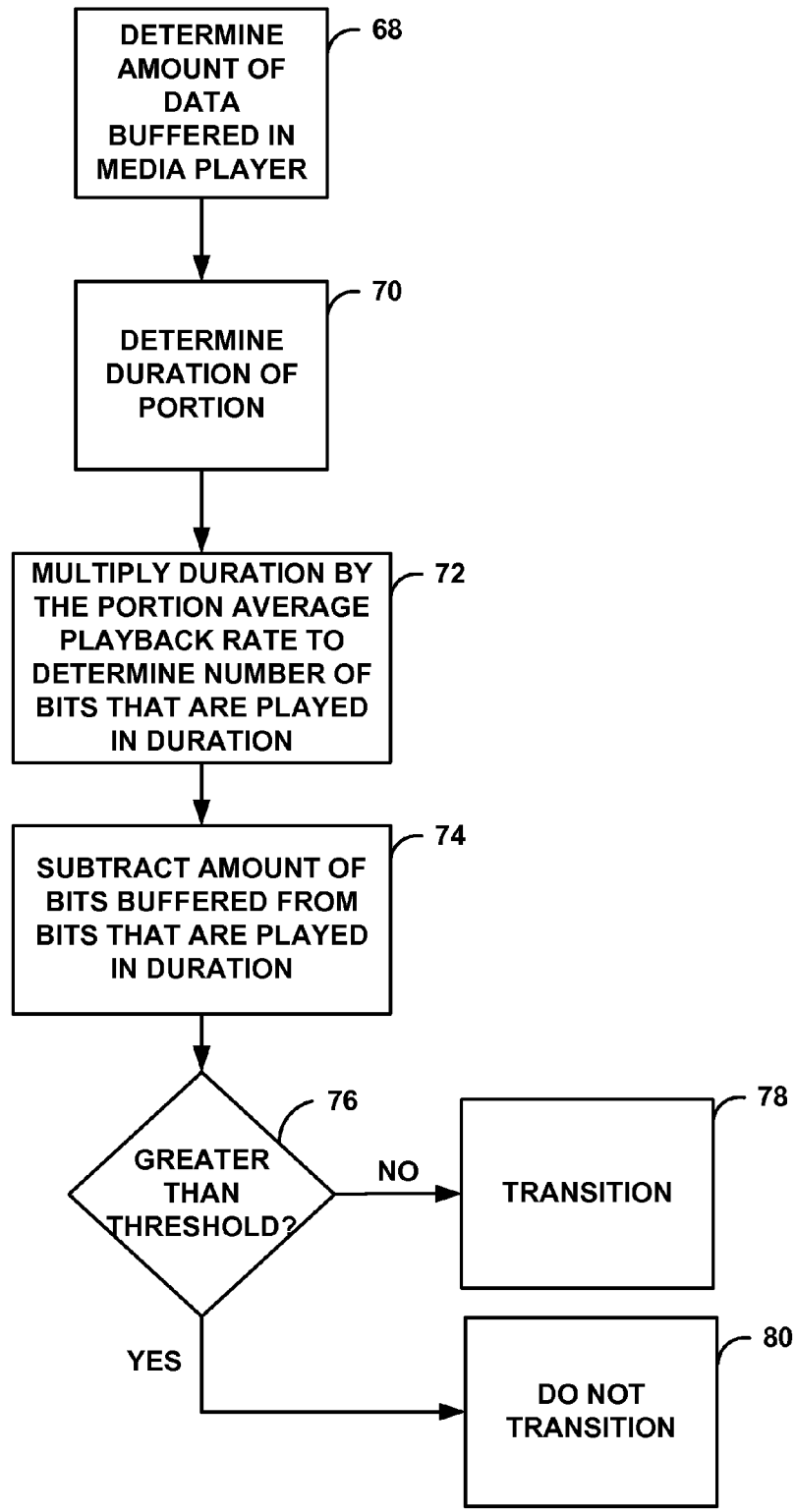
FIG. 7 is a flowchart illustrating an example technique of determining whether to transition to a different media file.

FIG. 7 is a flowchart illustrating an example technique of determining whether to transition to a different media file. For purposes of illustration, reference will be made to FIG. 3. The example technique described with respect to FIG. 7 is performed after playback controller 28 has already determined the portion average playback rate for a portion where the portion average playback rate is greater than the throughput rate. For clarity, step 44 in FIG. 5 and its associated text describes that portion average playback rate is determined by playback controller 28.

Playback controller 28 determines the amount of data buffered in media player 14 (68). For example, buffer 37 may provide the amount of data buffered in buffer 37 to playback controller 28. Next, playback controller 28 determines the duration of the portion within the current media where the portion average playback rate is greater than the throughput rate (70). As one example, playback controller 28 may determine the duration of the portion based on the timestamp data stored in temporal metadata 34.

Playback controller 28 then multiplies the determined duration of the portion with the portion average playback rate for the portion to determine the number of bits that are played during the portion where the portion average playback rate is greater than the throughput rate (72). For example, assume the duration of the portion is 10 seconds, and the portion average playback rate for the portion is 2 Mbps, then the number of bits that would be played during the 10 seconds is 20 megabits, i.e. 10 seconds multiplied by 2 Mbps. Playback controller 28 then subtracts the amount of data buffered in buffer 37 from the determined number of bits that are played during the portion where the portion average playback rate is greater than the throughput rate (74).

Next, playback controller 28 compares the subtracted value to a threshold value (76). The threshold value may be a minimum amount of data that media player 14 and/or download agent 16 desires to have buffered in buffer 37 at all times. For example, media player 14 may desire to have at least 100 kilobits of data buffered in buffer 37 in case of a catastrophic error, such as loss of connection to network 8 or loss of connection to media server 5. Media player 14 and/or download agent may desire to have some data buffered so that the user may view the buffered data while the catastrophic error is being fixed. However, this may not be necessary in all examples. In some examples, media player 14 and/or download agent 16 may not desire to maintain a minimum amount of buffered data. In such examples, the threshold value may be zero.

If the subtracted value is greater than the threshold value (YES of 76), playback controller 28 may determine that there is no need to transition to the selected different media file (80). In this case, buffer 37 may have enough data already stored in its buffer to withstand the duration, without pausing to rebuffer, where the portion average playback rate is greater than the throughput rate. Alternatively, if the subtracted value is less than the threshold value (NO of 76), playback controller 28 may determine that there is a need to transition to the selected different media file (78). In this case, buffer 37 may not have enough data already stored in its buffer to withstand the duration, without pausing to rebuffer, where the portion average playback rate is greater than the throughput rate.

Stated another way, if playback controller 28 did not transition to the selected different media file, the user of client device 4 may experience a less than desired viewing experience because media player 14 may have to pause to rebuffer data for the duration of the portion where the portion average playback rate was greater than the throughput rate.

Various aspects of the disclosure have been described. These and other aspects are within the scope of the following claims.

What is claimed is:

1. A method, comprising:
   monitoring, by a device including a processor, a download of a first media file from a media server at a throughput rate and a concurrent playback of the first media file, wherein the first media file is a first version of a media asset, the first media file is encoded at a variable bit rate and has a first overall average playback rate less than or equal to the throughput rate, the first media file has a plurality of portions with respective portion average playback rates, wherein at least two portions have different portion average playback rates;
   identifying, by the device, an undownloaded portion of the first media file that has a portion average playback rate that is greater than the throughput rate; and
   forecasting, by the device, whether an interruption will occur in playback of the first media file during the undownloaded portion, wherein the forecasting comprises:
   determining, by the device, an amount of bits buffered in a buffer;
   determining, by the device, a duration of the undownloaded portion;
   multiplying, by the device, the duration of the undownloaded portion and the portion average playback rate of the undownloaded portion to determine a number of bits that are played in the duration;
   determining, by the device, a difference between the amount of bits buffered in the buffer and the number of bits that are played in the duration;
   determining, by the device, whether the difference meets a threshold;
   in response to a determination that the difference meets the threshold, forecasting, by the device, that the interruption will occur; and
   in response to a determination that the difference does not meet the threshold, forecasting, by the device, that the interruption will not occur.

2. The method of claim 1, further comprising, in response to the forecasting that the interruption will occur, selecting, by the device, a second media file where a portion average playback rate of the second media file for a portion that is within the second media file and that corresponds to the undownloaded portion is less than or equal to the throughput rate, wherein the second media file is a second version of the media asset.

3. The method of claim 2, wherein the second media file is encoded at a variable bit rate and has a second overall average playback rate that is lower than the first overall average playback rate, the second media file has a plurality of portions with respective portion average playback rates, wherein at least two portions have different portion average playback rates.

4. The method of claim 2, wherein selecting the second media file comprises:
   determining respective portion average playback rates for portions of a plurality of media files corresponding to versions of the media asset, wherein the portions correspond to the undownloaded portion; and
   selecting the second media file from the plurality of media files based on the determining.

5. The method of claim 4, wherein the selected second media file has a portion corresponding to the undownloaded portion with a highest portion average playback rate of the portions of the plurality of media files.

6. The method of claim 2, wherein selecting the second media file further comprises:
   dividing the portion average playback rate for the undownloaded portion by an overall average playback rate of the first media file to generate a ratio;
   dividing the throughput rate by the ratio to generate a desired overall average playback rate; and
   selecting the second media file from a plurality of media files corresponding to versions of the media asset, wherein an overall average playback rate for the second media file is closest to the desired overall average playback rate.

7. The method of claim 2, further comprising;
   identifying, by the device, a first playback point in the first and second media files correlated to the undownloaded portion;
   downloading, by the device, one or more portions of the second media file that include at least the first playback point and the portion within the second media file that corresponds to the undownloaded portion; and
   transitioning, by the device, playback of the first media file to playback of the second media file at the identified first playback point.

8. The system of claim 2, wherein to select the second media file comprises:
   divide the portion average playback rate for the undownloaded portion by an overall average playback rate of the first media file to generate a ratio;
   divide the throughput rate by the ratio to generate a desired overall average playback rate; and
   select the second media file from a plurality of media files corresponding to versions of the media asset, wherein an overall average playback rate for the second media file is closest to the desired overall average playback rate.

9. The system of claim 1, wherein the playback controller is further configured to, in response to the forecasting that the interruption will occur, select a second media file where a portion average playback rate of the second media file for a portion that is within the second media file and that corresponds to the undownloaded portion is less than or equal to the throughput rate, wherein the second media file is a second version of the media asset.

10. The system of claim 9, wherein the second media file is encoded at a variable bit rate and has a second overall average playback rate that is lower than the first overall average playback rate, the second media file has a plurality of portions with respective portion average playback rates, wherein at least two portions have different portion average playback rates.

11. The system of claim 9, wherein to select the second media file comprises:
   determine respective portion average playback rates for portions of a plurality of media files corresponding to versions of the media asset, wherein the portions correspond to the undownloaded portion; and
   select the second media file from the plurality of media files based on the determined respective portion average playback rates.

12. The system of claim 11, wherein the selected second media file has a portion corresponding to the undownloaded portion with a highest portion average playback rate of the portions of the plurality of media files.

13. The system of claim 9, wherein the playback controller is further configured to
identify a first playback point in the first and second media files correlated to the undownloaded portion;
download one or more portions of the second media file that include at least the first playback point and the portion within the second media file that corresponds to the undownloaded portion; and
transition playback of the first media file to playback of the second media file at the identified first playback point.

14. A system, comprising:
a processor;
a memory communicatively coupled to processor, the memory having stored therein computer-executable instructions, comprising:
a playback controller configured to:
monitor a download of a first media file from a media server at a throughput rate and a concurrent playback of the first media file, wherein the first media file is a first version of a media asset, the first media file is encoded at a variable bit rate and has a first overall average playback rate less than or equal to the throughput rate, the first media file has a plurality of portions with respective portion average playback rates, wherein at least two portions have different portion average playback rates;
identify an undownloaded portion of the first media file that has a portion average playback rate that is greater than the throughput rate; and
forecast whether an interruption will occur in playback of the first media file during the undownloaded portion, wherein the forecasting comprises:
determine an amount of bits buffered in a buffer;
determine a duration of the undownloaded portion;
multiplie the duration of the undownloaded portion and the portion average playback rate of the undownloaded portion to determine a number of bits that are played in the duration;
determine a difference between the amount of bits buffered in the buffer and the number of bits that are played in the duration;
determine whether the difference meets a threshold;
in response to a determination that the difference meets the threshold, forecast that the interruption will occur; and
in response to a determination that the difference does not meet the threshold, forecast that the interruption will not occur.

15. A non-transitory computer-readable storage medium comprising instructions that cause one or more processors to perform operations comprising:
monitoring a download of a first media file from a media server at a throughput rate and a concurrent playback of the first media file, wherein the first media file is a first version of a media asset, the first media file is encoded at a variable bit rate and has a first overall average playback rate less than or equal to the throughput rate, the first media file has a plurality of portions with respective portion average playback rates, wherein at least two portions have different portion average playback rates;
identifying an undownloaded portion of the first media file that has a portion average playback rate that is greater than the throughput rate; and
forecasting whether an interruption will occur in playback of the first media file during the undownloaded portion, wherein the forecasting comprises:
determining an amount of bits buffered in a buffer;
determining a duration of the undownloaded portion;
multiplying the duration of the undownloaded portion and the portion average playback rate of the undownloaded portion to determine a number of bits that are played in the duration;
determining a difference between the amount of bits buffered in the buffer and the number of bits that are played in the duration;
determining whether the difference meets a threshold;
in response to a determination that the difference meets the threshold, forecasting that the interruption will occur; and
in response to a determination that the difference does not meet the threshold, forecasting that the interruption will not occur.

16. The non-transitory computer-readable storage medium of claim 15, the operations further comprising, in response to the forecasting that the interruption will occur, selecting a second media file where a portion average playback rate of the second media file for a portion that is within the second media file and that corresponds to the undownloaded portion is less than or equal to the throughput rate, wherein the second media file is a second version of the media asset.

17. The non-transitory computer-readable storage medium of claim 16, wherein selecting the second media file further comprises:
dividing the portion average playback rate for the undownloaded portion by an overall average playback rate of the first media file to generate a ratio;
dividing the throughput rate by the ratio to generate a desired overall average playback rate; and
selecting the second media file from a plurality of media files corresponding to versions of the media asset, wherein an overall average playback rate for the second media file is closest to the desired overall average playback rate.

18. The non-transitory computer-readable storage medium of claim 15, wherein the second media file is encoded at a variable bit rate and has a second overall average playback rate that is lower than the first overall average playback rate, the second media file has a plurality of portions with respective portion average playback rates, wherein at least two portions have different portion average playback rates.

19. The non-transitory computer-readable storage medium of claim 16, wherein selecting the second media file comprises:
determining respective portion average playback rates for portions of a plurality of media files corresponding to versions of the media asset, wherein the portions correspond to the undownloaded portion; and
selecting the second media file from the plurality of media files based on the determining.

20. The non-transitory computer-readable storage medium of claim 19, wherein the selected second media file has a portion corresponding to the undownloaded portion with a highest portion average playback rate of the portions of the plurality of media files.

* * * * *